United States Patent [19]

Mantegani

[11] 4,225,197

[45] Sep. 30, 1980

[54] INSULATION STRUCTURE FOR KILN ROLLERS AND ELEMENT FOR USE THEREWITH

[75] Inventor: Enzo Mantegani, Milan, Italy

[73] Assignee: Welko Industriale S.p.A., Milan, Italy

[21] Appl. No.: 947,178

[22] Filed: Sep. 29, 1978

[30] Foreign Application Priority Data

Oct. 7, 1977 [IT] Italy .............................. 28367 A/77

Jul. 10, 1978 [IT] Italy .............................. 25489 A/78

[51] Int. Cl.[3] .............................................. F16C 17/04

[52] U.S. Cl. ........................................ 308/37; 308/20; 432/121; 432/244; 432/246

[58] Field of Search ............... 432/244, 246, 239, 121; 198/780, 789; 308/20, 37

[56] References Cited

U.S. PATENT DOCUMENTS

| | | | |
|---|---|---|---|
| 1,988,110 | 1/1935 | Drake | 432/244 |
| 2,014,302 | 9/1935 | Waldron | 432/246 |
| 2,085,327 | 6/1937 | Payne | 432/244 |
| 2,175,834 | 10/1939 | Fatkin | 432/246 |
| 3,608,876 | 9/1971 | Leaich | 432/246 |
| 3,853,526 | 12/1974 | Hochart | 432/246 |
| 3,914,099 | 10/1975 | Cable et al. | 432/244 |
| 4,131,420 | 12/1978 | Miller | 432/246 |

FOREIGN PATENT DOCUMENTS

| | | | |
|---|---|---|---|
| 2221989 | 10/1974 | France | 432/246 |

*Primary Examiner*—Henry C. Yuen

*Attorney, Agent, or Firm*—Michael J. Striker; Michael J. Striker

[57] ABSTRACT

An insulation structure includes a hollow housing having first and second side walls spaced from each other, defining therebetween the interior of the housing. The walls are provided with a plurality of throughgoing holes. A plurality of rotatable rollers is provided in the housing extending from the first to the second walls. Each of the rollers has a portion which is narrower than that of the respective hole and which extends therethrough to the exterior of the housing. The structure is further provided with insulation to prevent heat leakage from the interior of the housing through the circumferential passage defined between the outer surface of each roller and the inner surface of the respective hole.

6 Claims, 3 Drawing Figures

INSULATION STRUCTURE FOR KILN ROLLERS AND ELEMENT FOR USE THEREWITH

BACKGROUND OF THE INVENTION

The present invention relates to kilns. More particularly the present invention relates to arrangements for preventing heat leakage from kilns.

It is known in the art to provide a kiln with a plurality of rotatable rollers serving to transport the items to be heat treated in the kiln. Usually, the rollers are all driven rollers. In order to be driven, each roller has a portion extending outwardly through the side walls of the kiln to be with a driving means located outside the kiln. For this purpose, the side wall is provided with a longitudinally extending row of bricks, each brick housing at least one throughgoing hole for receiving its respective roller.

The diameter of each hole must be larger than that of the roller located therein in order to permit the roller to rotate in the hole in spite of distortion of the hole caused by thermal expansion. However, the gap between the outer surface of the roller and the inner surface of the hole tends to permit undesirable leakage of heat from the interior of the kiln. The cumulative amount of heat leaking through all such clearances becomes a serious problem, since the number of rollers is larger.

SUMMARY OF THE INVENTION

It is a general object of the present invention to avoid the disadvantage of the prior art kilns.

More particularly, it is an object of the present invention to provide such a roller transport heating kiln which minimizes heat leakage from the interior of the kiln.

In pursuance of these objects and others which will become apparent hereafter, an improved kiln wall structure and an element for use in such walls are disclosed.

One of the main advantageous features of the present invention resides in providing the housing with means for preventing undesired heat leakage from the interior of the housing through such passages.

The journal block element is made of brick, and is installed in aligned rows along the walls of the kiln through which the rollers pass. Each of these elements is provided with at least one holes for receiving and end of its respective roller. The bricks are arranged so that the holes are aligned across the interior of the kiln. Each such element is further provided with a throughgoing recess extending along the length of the side wall and communicating at least partially with all its holes. The height of the recess exceeds the diameter of the hole.

The recess may then be packed with fibrous refractory insulation such as kaolin wool, thereby insulating all around the rollers. Such insulation minimizes any heat leakage from the interior of the housing through the circumferential passage.

In accordance with another embodiment of the present invention the recess of the element is open outside the side wall and then closed by a closing member attached to the wall. This feature renders it possible to replace or to add the insulation very easily. It is especially important in case of kaolin wool which tends to reduce its volume after temperature. This arrangement also facilitates access to a roller and, reducing the effort required for roller replacement on maintenance.

It is noteworthy that the present invention is convenient both for kilns having side walls of solid refractory bricks as well as for kilns having the side walls covered by layers of insulating refractory fiber lined by a layer of refractory material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
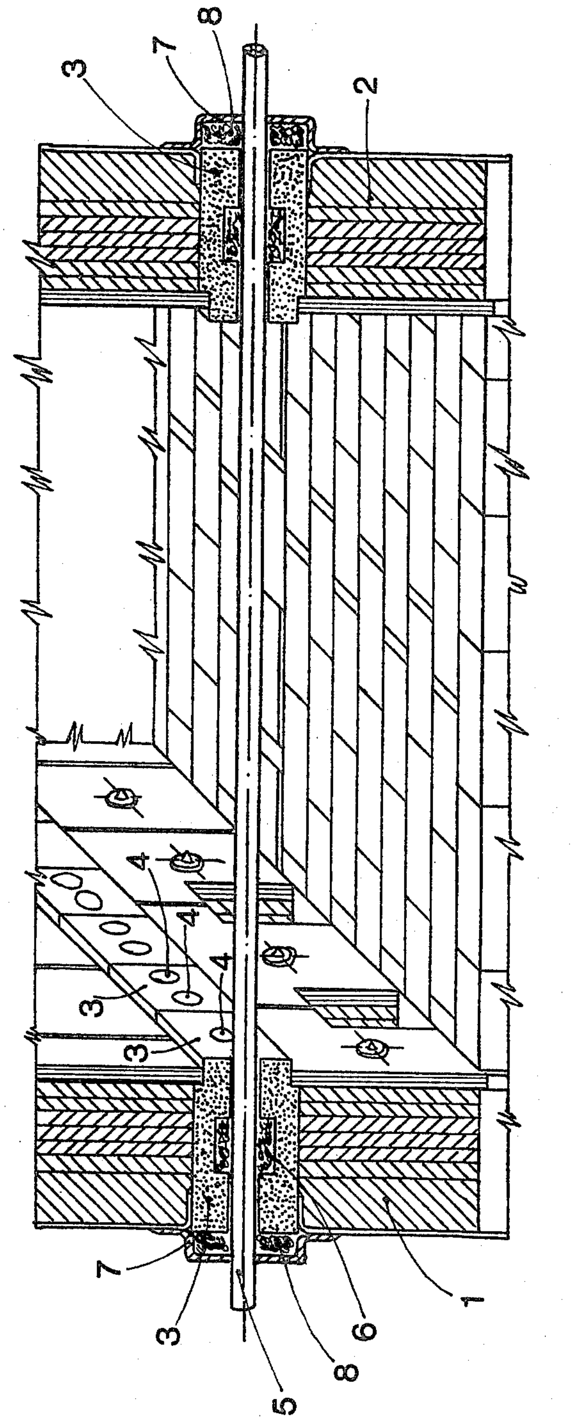
FIG. 1 is a partly cross-sectional view of a arrangement in accordande with the present invention.
Figure 2:
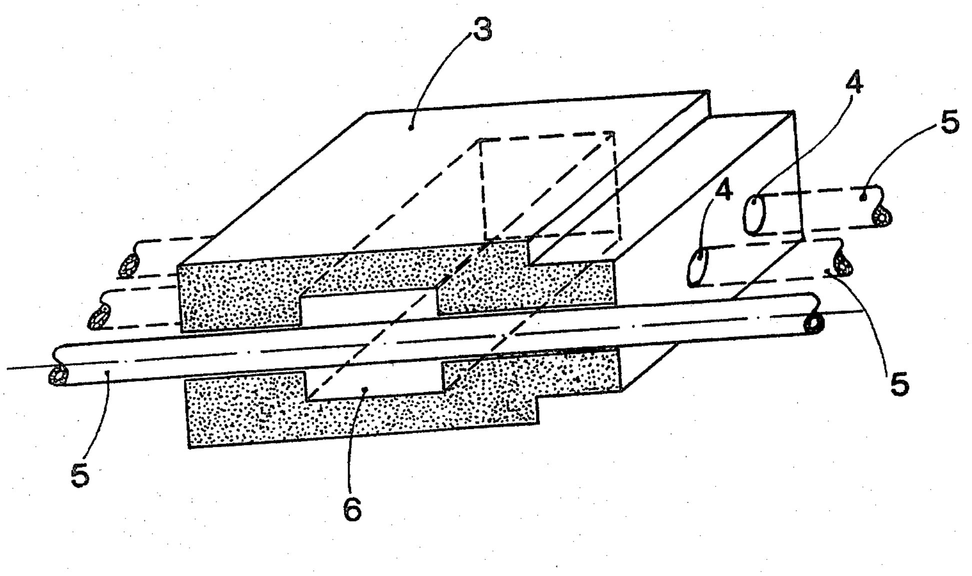
FIG. 2 is a perspective view of a part of the arrangement of FIG. 1.

Referring now to the drawings and first to the FIG. 1 and FIG. 2 thereof, it may be seen that reference numerals 1 and 2 designate two opposite side walls of a roller kiln. The walls 1 and 2 are provided (for example in the middle thereof) with respective rows of brick elements 3. Each element in one wall is in alignment with its corresponding element on the opposite wall, and has at least one hole 4. In this embodiment there are two such holes. The elements 3 of both walls 1 and 2 are so arranged that each hole 4 of each element of one wall is coaxial with the corresponding hole of the element of the opposite wall. All holes 4 extend completely through their respective elements. Each pair of coaxial holes 4 can receive the respective ends of roller 5, the central portion of which extends transversely through the interior of the kiln. The portions of the roller 5 which extend outwardly beyond the side wall are connected with a rotate arrangement (not shown) to drive the respective roller 5, and thereby transport the items to be treated along the length of the interior of the kiln. Each element 3 is further provided with a recess extending parallel to the length of the wall, and thus perpendicular to the axes of holes 4. Each recess intersects with holes 4 to form a chamber 6.

The recess has a height dimension larger than the diameter of holes 4. Each chamber 6 is filled with fibrous refractory insulation 6', such as kaolin wool, which is packed into the chamber under pressure, so as to completely embrace roller 5 and to thence, form a thermal seal. The seal minimizes heat leakage from the interior of the kiln through the circumferential passage defined between the outer surface of the roller 5 and the inner surface of the respective hole 4.

A retainer housing 7 is mounted on the outer side of the walls 1 and 2 so as to cover the outer face of each element 3. The retainer housing 7 is provided with a central hole which is aligned with hole 4 when the retainer housing 7 is affixed to with the outer sides of the walls 1 and 2. This allows the end of roller 5 to project through and beyond the retainer housing 7. The central portion of the retainer housing 7 is so shaped (for example has a 'C' cross-section) as to bound a chamber 8 along with the outer face of the element 3. The chamber 8 is filled with kaolin wool to further minimize heat leakage from the interior of the kiln.

Figure 3:
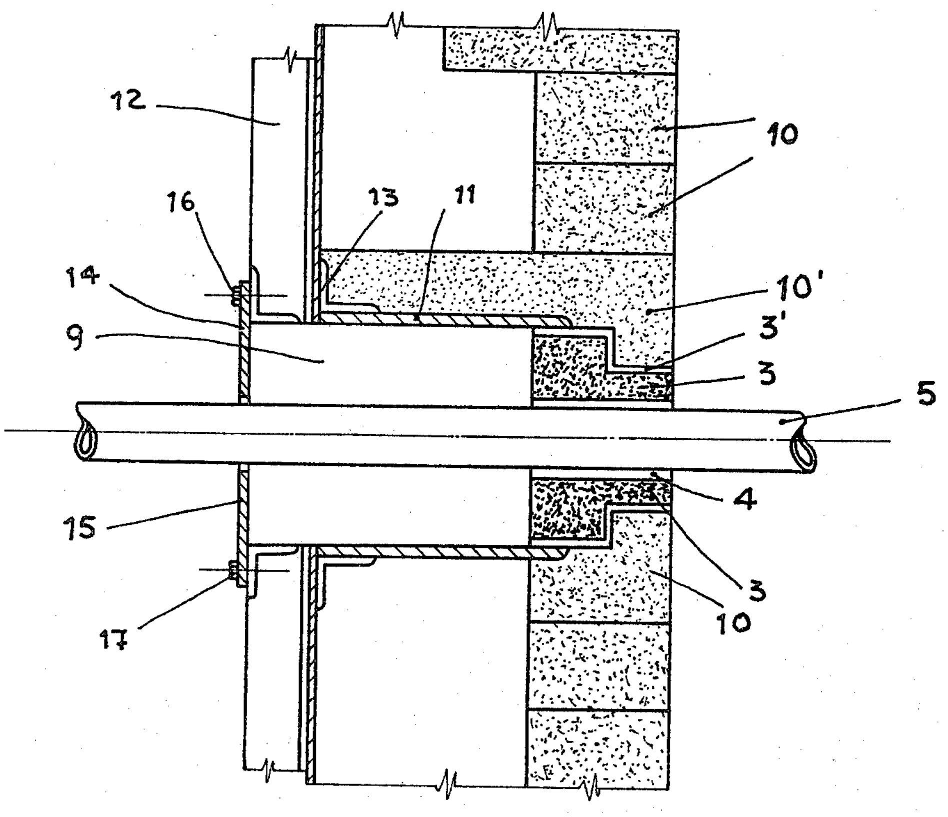
FIG. 3 is a partly cross-sectional view of a part of another embodiment utilizing the invention.

FIG. 3 shows another embodiment of the present invention. In accordance with this embodiment, the journal block element 3 has a thickness smaller than the thickness of the side wall 1 which is primarily composed of bricks 10. The thickness of the wall is defined by the thickness of the supporting element 10' of refractory solid material. Thus, the supporting bricks 10' are so arranged as to define a chamber 9 with the journal block brick 3. The chamber 9 is designed to be filled with kaolin wool or other fibrous refractory material.

This structure is provided with exterior stout metallic plates 11 of refractory steel supported by two uprights 12 and longitudinal beams 13, to provide increased mechanical strength. The journal block elements 3 are separated from the adjacent bricks 10 and 10' by first means 3' composed of fibrous material. Thus, the elements 3 do not directly adhere to elements 10'0 so that the supporting bricks 3 can be easily removed, for maintenance purposes, without removing a piece of the wall.

This embodiment has the advantage that the chamber 9 is more easily accessible than in the previous embodiment.

The chamber 9 is closed from the outside by an upper sheet 14 and a lower sheet 15 (which may be integrally connected) which, when assembled, provide a hole coaxial with the hole 4 for permitting the roller 5 to extend beyond the sheets 14 and 15. These two sheets should be easily removable. For this purpose they are detachably mounted to the wall by means of bolts 16 and 17. It is clear, from FIG. 3, that in order to remove, replace or add the insulating material or to maintain the rollers it is only necessary to remove one or both sheets 14 and 15.

It will be understood that each of the elements described above, or two or more together, may also find a useful application in other contexts differing from those described above.

While the invention has been illustrated and described as embodied in a kiln, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An improved bearing structure for supporting ends of rollers as the rollers pass through supporting walls designed to close off gaps between the rollers and the wall and to allow easy access to the rollers which due to their composition are fragile and must be frequently replaced by withdrawing said rollers without disrupting the operations utilizing said bearing structure, comprising: a vertical wall with an inside surface and an outside surface and having a throughgoing passage; a supporting block embedded in the wall and extending horizontally away from the outside surface of the wall at right angles; a fixed frame attached to the block which otherwise would be without sufficient strength to support the weight of the wall and thereby supporting the block and the wall, the frame communicating with the passage to form a hollow chamber; a journal block element sahped to be detachably securable within the passage in the wall, the journal block having a throughgoing horizontal bore which is sufficiently large to accomoate a roller end; first means cooperating with the journal block element and the wall to detachably secure the journal block element within the wall in a manner that no gap is formed between the journal block element and the wall; a panel detachably securable to the frame to close off the end of the chamber remote from the wall; and second means detachably securing the panel to the frame; wherein the first means is an insulation material wedged between the wall and the journal block element.

2. The structure of claim 1, wherein the panel bears a hole which is the same diameter as the bore, and is aligned with the bore when the panel is secured to the frame.

3. The structure of claim 1, wherein the journal block element is of brick.

4. The structure of claim 1, wherein the frame is steel.

5. The structure of claim 1, wherein the insulation is made of a refractory material.

6. The structure of claim 5, wherein the insulation of kaolin wool.

* * * * *